US 12,470,906 B2

(12) United States Patent
Barqawi et al.

(10) Patent No.: US 12,470,906 B2
(45) Date of Patent: *Nov. 11, 2025

(54) PERSONNEL TRACKING AND EMERGENCY NOTIFICATION SYSTEM

(71) Applicant: ProSafe IP LLC, Sewell, NJ (US)

(72) Inventors: Yazan Barqawi, Sewell, NJ (US); Terrance Ruf, Sewell, NJ (US); Tomas Giraldo, Clearwater, FL (US)

(73) Assignee: ProSafe IP LLC, Sewell, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/772,142

(22) Filed: Jul. 13, 2024

(65) Prior Publication Data

US 2024/0373205 A1  Nov. 7, 2024

Related U.S. Application Data

(63) Continuation of application No. 18/128,318, filed on Mar. 30, 2023, now Pat. No. 12,047,857, which is a
(Continued)

(51) Int. Cl.
*H04W 4/90* (2018.01)
*G08B 21/18* (2006.01)
(Continued)

(52) U.S. Cl.
CPC ............ *H04W 4/90* (2018.02); *G08B 21/182* (2013.01); *H04B 1/385* (2013.01); *H04W 4/029* (2018.02); *H04B 2001/3861* (2013.01)

(58) Field of Classification Search
CPC ...... H04W 4/90; H04W 4/029; G08B 21/182; H04B 1/385; H04B 2001/3861
(Continued)

(56) References Cited

U.S. PATENT DOCUMENTS 7,388,490 B2 * 6/2008 Freitag ..................... G01S 1/68
340/572.1
8,755,767 B2 * 6/2014 Maier ..................... H04W 4/90
455/404.1
(Continued)

*Primary Examiner* — Zhen Y Wu
(74) *Attorney, Agent, or Firm* — Joseph E. Maenner; Maenner & Associates, LLC

(57) ABSTRACT

A platform that utilizes QR codes, Radio Frequency Identification and/or Near Field Communication for geolocation in securing users safety and a MESH network to ensure emergency safety device performs under any network configuration cellular/wifi/bluetooth. The platform enables the dashboard and/or application programs executing thereon to effectively secure users of platform with audio/visual recordings of any such events which may endanger an associate working in a discrete location on their own. A user can also locate the associate in the case of an emergency. The platform also enables speech enabled summoning of the panic button. The platform plans to utilize ultra wide band technologies in addition to cellular/wifi/bluetooth channels. The platform is also available to emergency services based on the severity of an issue that may arise. The platform can also transmit single channel walkie talkie services to users of platform at the same location.

18 Claims, 3 Drawing Sheets

Related U.S. Application Data continuation of application No. 17/533,159, filed on Nov. 23, 2021, now Pat. No. 11,632,663, which is a continuation of application No. 17/241,116, filed on Apr. 27, 2021, now Pat. No. 11,212,659.

(60) Provisional application No. 63/017,687, filed on Apr. 30, 2020.

(51) Int. Cl.
*H04B 1/3827* (2015.01)
*H04W 4/029* (2018.01)

(58) Field of Classification Search
USPC .......................................... 340/584
See application file for complete search history.

(56) References Cited

U.S. PATENT DOCUMENTS

| | | | | |
|---|---|---|---|---|
| 10,306,420 | B2* | 5/2019 | Zhou | H04W 4/80 |
| 10,588,004 | B2* | 3/2020 | Eisner | H04W 4/14 |
| 10,856,127 | B2* | 12/2020 | Maier | G08B 21/182 |
| 10,912,056 | B2* | 2/2021 | Eisner | H04W 4/02 |
| 11,188,806 | B2* | 11/2021 | Bakke | G06K 19/0723 |
| 2006/0282021 | A1* | 12/2006 | DeVaul | A61B 5/0205 |
| | | | | 600/595 |
| 2007/0008129 | A1* | 1/2007 | Soliman | G01S 5/0289 |
| | | | | 340/572.1 |
| 2007/0013516 | A1* | 1/2007 | Freitag | H04M 7/006 |
| | | | | 340/572.1 |
| 2007/0232293 | A1* | 10/2007 | Goldman | H04W 4/18 |
| | | | | 455/426.1 |
| 2011/0227726 | A1* | 9/2011 | Lee | G08B 21/0202 |
| | | | | 340/539.13 |
| 2012/0329529 | A1* | 12/2012 | van der Raadt | H04M 1/72403 |
| | | | | 455/566 |
| 2013/0060167 | A1* | 3/2013 | Dracup | G16H 80/00 |
| | | | | 600/595 |
| 2013/0176113 | A1* | 7/2013 | Mallin | G06K 7/01 |
| | | | | 340/10.1 |
| 2015/0181402 | A1* | 6/2015 | Cooler | H04W 4/90 |
| | | | | 455/404.1 |
| 2017/0206774 | A1* | 7/2017 | Park | G08B 7/06 |
| 2017/0286904 | A1* | 10/2017 | Paris, Jr. | A61L 2/24 |
| 2017/0293740 | A1* | 10/2017 | Xing | G06Q 20/204 |
| 2018/0310159 | A1* | 10/2018 | Katz | H04M 3/42161 |
| 2019/0088106 | A1* | 3/2019 | Grundstrom | H04W 4/90 |
| 2019/0187643 | A1* | 6/2019 | Carpenter | H04W 4/38 |
| 2019/0220715 | A1* | 7/2019 | Park | G06Q 10/087 |
| 2019/0371440 | A1* | 12/2019 | Parvaneh | A61B 5/6801 |
| 2020/0019682 | A1* | 1/2020 | Lee | H04L 63/0853 |
| 2020/0059776 | A1* | 2/2020 | Martin | H04M 1/72439 |
| 2020/0098246 | A1* | 3/2020 | Stafford | H04M 1/72424 |
| 2020/0175639 | A1* | 6/2020 | Sabripour | H04W 4/90 |
| 2020/0245097 | A1* | 7/2020 | Stackpole | H04W 4/023 |
| 2020/0260224 | A1* | 8/2020 | Streltsyn | G06Q 20/384 |
| 2021/0118276 | A1* | 4/2021 | Matsuzawa | G06F 1/163 |
| 2021/0382958 | A1* | 12/2021 | Fowler | G06K 7/10297 |
| 2023/0169845 | A1* | 6/2023 | Turner | G08B 25/016 |
| | | | | 455/404.1 |

* cited by examiner

PERSONNEL TRACKING AND EMERGENCY NOTIFICATION SYSTEM

BACKGROUND OF THE INVENTION

Field of the Invention

The present invention relates to a wireless system or tracking the location of mobile personnel in an organization and an emergency notification system that the personnel can use in the event of an emergency at their location.

Description of the Related Art

Hotels typically employ multiple employees such as housekeepers, mobile security guards, and other, whose duties require them to move to different parts of the hotel. Occasionally, these employees encounter emergent situations that warrant the immediate notification of the situation in the hotel to supervisors and/or first responders.

It would be beneficial to provide a system that can track the location of each moving employee and allow such employees to quickly transmit a message to a supervisor about an emergent situation without having to specifically transmit their location in the hotel.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention provides a safety network comprising a plurality of location indicators. Each location indicator is configured to identify a unique location in a facility. A plurality of mobile electronic devices are each configured to read one of the location indicators and transmit a first electronic signal associated with the one of the location indicators and to transmit a second electronic signal associated with an emergency condition proximate to the one of the location indicators. An administrative server contains a non-transitory machine-readable storage medium, having encoded thereon program code. When the program code is executed by a machine, the machine implements a method for receiving the first electronic signal and the second electronic signal and for determining and storing a location of the mobile electronic devices based on the first electronic signal. A monitoring electronic device is electronically connected to the server and is configured to display location information for each of the mobile electronic devices based on the first electronic signal and to display an indication based on the second electronic signal that the emergency condition exists.

In an alternative embodiment, a safety network comprises a location indicator configured to identify a unique location in a facility, a first electronic device configured to read the location indicator and to transmit a first electronic signal associated with the location indicator and a second electronic signal associated with an emergency proximate to the location indicator, and a second electronic device configured to receive the first electronic signal and the second electronic signal and to record information related to the first electronic signal and the second electronic signal to a database and to generate and transmit a third electronic signal to a third electronic device, the third electronic signal configured to alert a user to the emergency.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION

Figure 1:
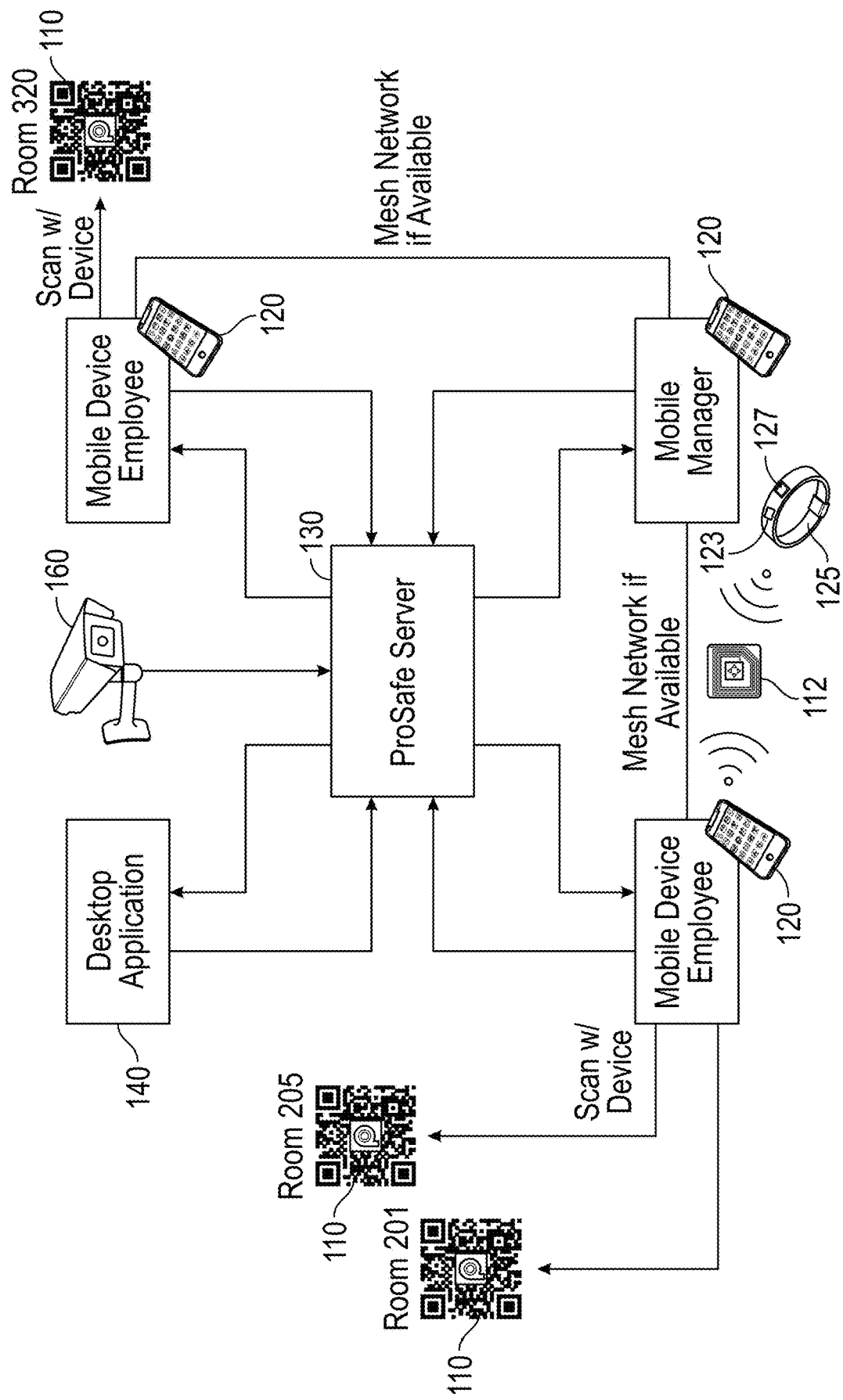
FIG. 1 is a schematic view of an exemplary embodiment of the personnel tracking and emergency notification system according to the present invention.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The word "about" is used herein to include a value of +/−10 percent of the numerical value modified by the word "about" and the word "generally" is used herein to mean "without regard to particulars or exceptions."

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The present invention can be used in a facility such as a hotel/motel (from here on "hotel") setting and can be used to track the location of mobile employees, such as housekeepers, mobile security guards, and other employees whose duties require them to move to different parts of the hotel. Occasionally the mobile employee encounter emergent situations such as, but not limited to, the employee's safety being compromised, a guest being found non-responsive, a fire burning, or finding illegal contraband in a guest room.

Referring to the schematic of FIG. 1, the present invention is a safety network 100 that includes a plurality of location indicators 110, such that each location indicator 110 is configured to identify a unique location in the hotel. System 100 also includes a plurality of mobile electronic devices 120 that are configured to read each of the location indicators 110 and transmit a first electronic signal associated with the read location indicator 110.

The first electronic signal is transmitted to an administrative server 130 containing a non-transitory machine-readable storage medium, having encoded thereon program code, wherein, when the program code is executed by a machine, the machine implements a method for receiving the first electronic signal and for determining and storing a location of the mobile electronic devices 120 based on the first electronic signal.

Additionally, each of the mobile electronic devices 120 is also configured to transmit a second electronic signal to the server 130. The second electronic signal can be associated with an emergency condition proximate to the one of the location indicators 110.

A monitoring electronic device 140 is electronically connected to the server 130 and is configured to display location information for each of the mobile electronic devices 120 based on the first electronic signal and to display an indication based on the second electronic signal that the emergency condition exists.

By way of example only, location indicators 110 can be actively scannable indicators, such as quick response ("QR") codes, applied to adhesive-backed substrates that can be applied to specific locations throughout the hotel, such as in the door jambs of each guest room and work room (e.g. laundry room, supply room, trash room, etc.) such that each QR code is coded to the specific location where the QR code is applied. Alternatively, location indicators 110 can be bar codes or other devices that can uniquely identify a location.

By way of example only, mobile electronic devices 120 can be cell phones with a camera and an application ("app") or other software that can read the location indicator 110 and transmit the first signal to the administrative server 130 to log in the location of the employee at the particular location indicator 110 that was scanned. Additionally, mobile electronic device 120 can include a walkie-talkie functionality that uses a single channel tied to each specific property that is monitored by system 100.

Figure 2:
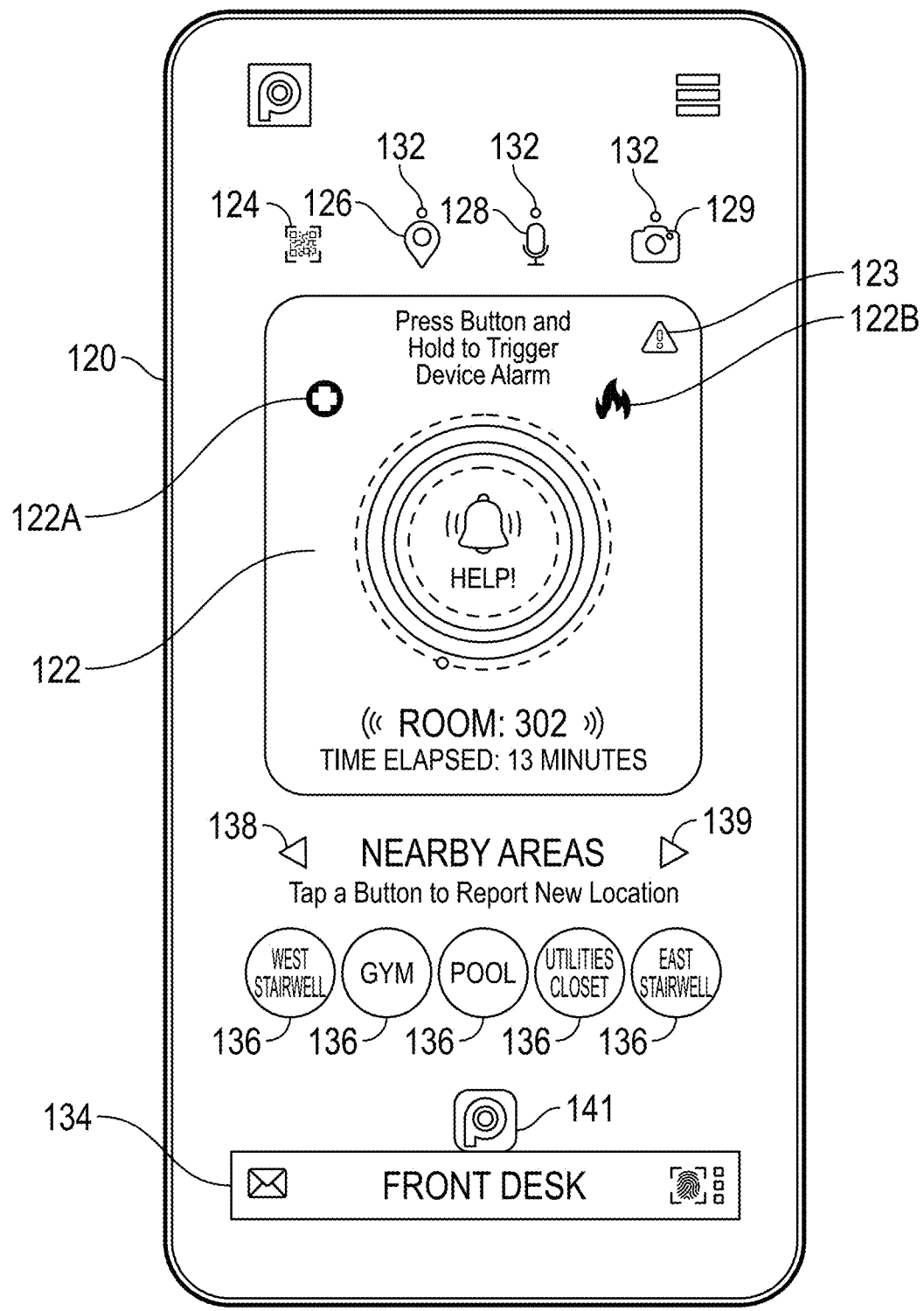
FIG. 2 is an exemplary graphical user interface of a mobile electronic device used with the system of FIG. 1.

An exemplary screen shot of mobile electronic device 120 is shown in FIG. 2.

In the event of an emergency, the employee can tap a panic button 122 on the electronic device 120 or speak into the electronic device to transmit the second, or emergency, signal to the administrative server 130 to quickly indicate the presence of an emergency condition. Panic button 122 can include multiple buttons 122, 122A, 122B to distinguish between a police emergency, a medical emergency, or a fire emergency to inform the manager of the type of responder that should be contacted to address the emergency. The second signal can be generated by touch or sound. The administrative server 130 will already have the location of the electronic device (and, thus, the employee) in its database by way of the first electronic signal. When panic button 122, 122A, 122B is pressed, the emergency signal is transmitted not only to administrative server 130, but to all logged in users as well to notify them of an emergency situation. Additionally, pressing panic button 122, 122A, 122B can also autodial 911 emergency response.

Further, administrative server 130 is configured to store electronic audio files of sound samples throughout the location (i.e., hotel) and compare sounds provided via a microphone in mobile electronic device 120 with the sound samples. Exemplary sound samples can be taken from the laundry room, pool, kitchen, lobby, or other locations throughout the hotel. When panic button 122 is pressed, the microphone is automatically activated to pick up ambient sounds where mobile electronic device 120 is located. Those sounds are compared to the stored electronic audio files and, if a match (or close match) is found, the location associated with that file is displayed on monitoring electronic device 140 so that the party monitoring electronic device 140 knows where to respond or where to direct responders when they arrive at the location.

Further, the microphone on mobile electronic device 120 can also be used to transmit an electronic signal to monitoring electronic device 140 in the event that the microphone picks up a sound above a predetermined threshold, such as, for example, 95 decibels (dB). A typical human scream registers approximately 100 dB, so a sound at or around that sound level can at least generate an alarm at monitoring electronic device 140 to encourage the person at monitoring electronic device 140 to inquire into the source or reason for the sound or to summon help.

System 100 can also use passively scanned tags 112, such as Radio Frequency Identification ("RFID") and/or Near Field Communication ("NFC") devices for public spaces, as compared to QR codes as location indicators 110 to track elevations. For example, instead of or in addition to location indicator 110, passively scanned tags 112 can be located in public spaces, such as stairwells, elevator lobbies, laundry rooms, etc. A benefit to passively scanned tags 112 is that passively scanned tags 112 do not need to be physically scanned in the case of an emergency. However, by passing near passively scanned tags 112, the passively scanned tags 112 can be automatically picked up by electronic device 120 and the location of the employee can be automatically transmitted to server 130. The information provided by passively scanned tags 112 can indicate a floor of the building where the employee is located. An exemplary wrist band 125 can be the B10 Smart Multi-use Wristband manufactured by Minew.

System 100 can also include a wrist band 125 worn by the employee. Wrist band 125 is capable of transmitting to passively scanned tags 112 to transmit the location of wrist band 125 (and the employee) to server 130. Wrist band 125 includes a button 127 that the employee can press for panic alert, similar to the panic button 122 described above. Button 127 communicates via Bluetooth to the employee's mobile electronic devices 120, which would then transmit the second electronic signal to server 130 to transmit the distress signal to monitoring electronic device 140 to display location information for the mobile electronic devices 120 associated with that particular wrist band 125.

Wrist band 125 also incorporates an electronic key that allows access to rooms. When the employee waves wrist band 125 in front of a lock on a room door, the lock will register that the employee is allowed access to the room and will automatically unlock via wireless communication, such as RFID, NFC, Bluetooth, or other suitable wireless method. Using wrist band 125 to unlock a room door can also be used to transmit the first electronic signal from electronic device 120 to server 130, without having to actively scan location indicator 110. As wrist band 125 electronically unlocks the door, wrist band 125 can transmit a Bluetooth or other wireless signal to mobile electronic device 120 to inform mobile electronic device 120 that a particular room has just been unlocked. Mobile electronic device 120 can then transmit the first electronic signal to server 130 with information about the room, such as the room number and the time that the room was unlocked.

Wrist band 125, as well as mobile electronic device 120 can each also include a temperature sensor 123 that can monitor the ambient temperature. When temperature sensor 123 reads a temperature above a predetermined temperature, wrist band 125 and/or mobile electronic device 120 transmits an electronic signal to administrative server 130, which in turn transmits another electronic signal to monitoring electronic device 140 to notify personnel of the high temperature. Optionally, administrative server 130 can be programmed to notify 911 emergency response of a possible fire as a result of the high temperature.

Mobile electronic device 120 can include a gyroscope incorporated therein. If the employee should fall, the sudden acceleration of mobile electronic device 120 as a result of the fall will automatically generate the second electronic signal if no movement is detected after the fall. Additionally, if the gyroscope does not detect movement for a predetermined period of time, mobile electronic device 120 can also transmit the second electronic signal to notify management to check in on the employee.

A scan button 124 can be pressed to activate mobile electronic device 120 to scan a new location indicator 110 after activating panic button 122. A location icon 126 indicates that the employee's location is constantly updated after panic button 122 is activated. A microphone icon 128 indicates that mobile electronic device 120 is recording all audio after panic button 122 is pressed. A camera icon 129 indicates that a camera on mobile electronic device 120 is recording all video after panic button 122 is pressed. The circular icon 132 on top of the icons 126, 128, 129 indicates that what is being captured after panic button 122 is pressed.

A mail icon 134 allows the employee to type or dictate a message that can be sent to a manager, security, or other predetermined party after panic button 122 is pressed. Location buttons 136 can be selectively pressed by the employee to update their location after exiting the previously scanned location where the emergency is occurring. Arrows 138, 139 can be pressed to display other location icons that do not initially fit on the display. Further, each mobile electronic device 120 can include an ultrawide band chip that allows management and security to determine the location of the employee within a quarter of a meter.

Icon 141 can be highlighted in red after panic button 122 is pressed to notify the employee that the second electronic signal was sent.

By way of example only, the administrative server 130 can be located on site, such as in a manager's office or in a security office, if present, or offsite. Data contained on the administrative server 130 is accessible only by personnel categorized in a predetermined personnel category, such as, for example, a manager, assistant manager, or security personnel.

After the second electronic signal is received by the administrative server 130, the administrative server 130 is configured to automatically transmit a third electronic signal to the plurality of mobile electronic devices 120. The third electronic signal can be generated by a push notification server 132 that is configured specifically to transmit the third electronic signal. As shown in FIG. 1, the push notification server 132 can be part of the administrative server 130 and can be integrated into the program code on the administrative server 130. Alternatively, the push notification server 132 can be a commercially available system such as provided by www.pusher.com.

By way of example only the third electronic signal can inform other housekeepers that an unsafe situation is present at the hotel and that each housekeeper is to lock herself into the room where she last logged in until a manager, security personnel, or first responders either electronically contact the housekeeper to inform her that the safety situation has cleared or personally go to the housekeeper's location to escort her to a safe location.

Optionally, after the second electronic signal is received by the administrative server 130, the administrative server 130 can be configured to automatically transmit a fourth electronic signal to a first responder. For example, if the second electronic signal indicates that a fire is present at the hotel, the fourth electronic signal can be automatically transmitted to a local fire department to inform the fire department of the fire.

By way of example only, the monitoring electronic device 140 comprises a main office video screen. Alternatively, the monitoring electronic device 140 can further comprise a security office video screen, if the particular hotel has a dedicated security office.

Figure 3:
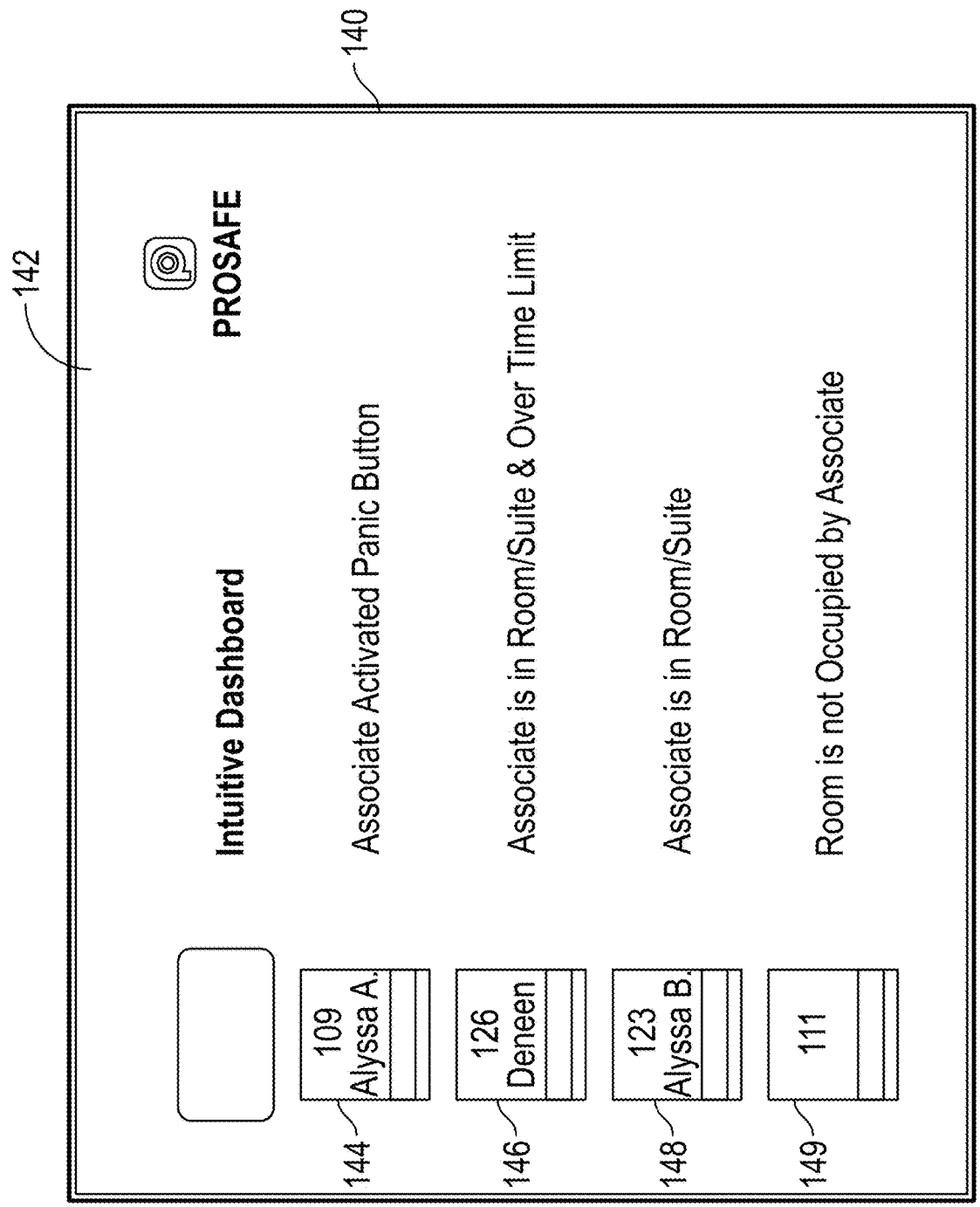
FIG. 3 is an exemplary graphical user interface of a monitoring electronic device used with the system of FIG. 1.

Referring to the dashboard 142 on monitoring electronic device 140 as shown in FIG. 3, from the moment the panic button 122 is pressed, system 100 automatically begins to record audio/visual from the mobile electronic device 120 on which panic button 122 is activated. Information from the mobile electronic device 120 is visible on the dashboard 142 when the panic button 122 is activated, audio/visual is stored on remote server 130, and only predetermined users with permissions can view and listen to audio and visual data after the data is uploaded to the remote server 130 in the case the data is graphic in nature. Information gathered is stored indefinitely and is tied to an incident report of the occasion.

Dashboard 142 also provides the status of other employees using system 100. In the event that an employee does push the panic button 122, that employee's status is displayed at the top of dashboard 142 to enable management/security to rapidly see that an emergency situation is present.

The status of other employees is also provided on dashboard 142. By way of example only, an icon 146 can indicate that an employee is at a particular location and has been at that location for a time duration longer that allotted to be in tht location. Icon 146 can provide an indication to a manager that an employee should be checked on to monitor that employee's progress or status at the location.

Icon 148 can indicate that an employee has checked into a location and icon 149 can indicate that no employee is in a particular location. Different statuses can be color coded to quickly enable a manager or security personnel to determine the status of each employee or location.

In addition to enabling employees to quickly notify managers and security of an emergency situation, system 100 can also be used to track the activity of employees. From the time an employee scans into a location indicator 110, the employee may have to temporarily leave the location to perform an associated duty, and then return to the location.

By way of example only, in a hotel environment, a housekeeper may use mobile electronic device 120 to scan a guest room having a location indicator 110 in order to clean the room. The housekeeper may need to leave the guest room to visit a linen closet, to use the public restroom, or to make another stop, prior to completing the guest room. System 100 logs all of the scans but keeps the timer running from the original scan of the location indicator 110 until the housekeeper scans into a new guest room, which would then log the time it took to complete the initial guest room and would include all of the housekeeper's stops in an activity log maintained on server 130.

Additionally, based on the time log of the scan into the guest room, system 100 can be configured to notify the housekeeper that she is approaching a predetermined time limit to clean the guest room to encourage the housekeeper to wrap up what needs to be done to complete cleaning the guest room.

Optionally, system 100 can also integrate video cameras 160 that are mounted in strategic locations throughout the property, such as, for example, hallways, stairwells, and other "non-private (e.g. hotel guest rooms)" locations. Cameras 160 transmit a video feed directly to server 130. Each camera 160 is also associated with specific location indicators 110 within the field of view of camera 160. During an emergency, the video feed from camera 160 that has a field of view of the location where the emergency originates is automatically displayed on dashboard 142 to provide a manager and security with a visual display of the emergency location.

While the present invention is described for use in a hotel environment, those skilled in the art will recognize that the present invention can be used to support other types of buildings, facilities, and industries as well.

It will be further understood that various changes in the details, materials, and arrangements of the parts which have been described and illustrated in order to explain the nature of this invention may be made by those skilled in the art without departing from the scope of the invention as expressed in the following claims.

We claim:

1. A safety network comprising:
   a location indicator configured to identify a unique location in a facility;
   a portable first electronic device configured to passively read the location indicator and to transmit a first electronic signal associated with the location indicator, wherein the signal includes information relating to a room and a floor in a multi-floor building;
   a second electronic device configured to receive the first electronic signal and to record information related to the first electronic signal to a database; and
   a portable third electronic device configured to transmit a second electronic signal to the second device upon being actively activated, wherein, after the second electronic signal is received by the second electronic device, the second electronic device is configured to automatically transmit a third electronic signal to a fourth electronic device and to automatically transmit a fourth electronic signal to a first responder, wherein the portable first electronic device comprises a wrist band configured to transmit location information to the second electronic device and to electronically unlock a lock.

2. The safety device according to claim 1, wherein the facility comprises a hotel.

3. The safety device according to claim 1, wherein the portable first electronic device is associated with a housekeeper.

4. The safety network according to claim 1, wherein the second electronic device is associated with a manager.

5. The safety device according to claim 1, wherein the portable third electronic device is associated with a housekeeper.

6. The safety network according to claim 1, wherein the location indicator comprises a QR code.

7. The safety network according to claim 6, wherein the second electronic device comprises a push notification server, wherein the push notification server is configured to transmit the third electronic signal.

8. The safety network according to claim 1, wherein transmission of the first electronic signal starts a timer.

9. The safety network according to claim 8, wherein the second electronic device transmits a third electronic signal to the first electronic device to notify a user of the first electronic device that the timer is approaching a predetermined time limit.

10. The safety network according to claim 1, wherein the location indicator comprises a Radio Frequency Identification tag.

11. The safety network according to claim 1, wherein the location indicator comprises a Near Field Communication device.

12. The safety network according to claim 1, wherein the location indicator comprises a first location indicator, and wherein the portable first electronic device is configured to update the unique location based on a second location indicator at a second location.

13. The safety network according to claim 1, wherein the portable third electronic device comprises a walkie talkie feature.

14. A safety network comprising:
   a location indicator configured to identify a unique location in a facility;
   a video camera such that the unique location is within a field of view of camera;
   a portable first electronic device configured to read the location indicator and to transmit a first electronic signal associated with the location indicator;
   a second electronic device configured to receive the first electronic signal and to display information related to the first electronic signal on an electronic video screen, wherein after the second electronic device receives the first electronic signal, a video feed from the video camera automatically displays the unique location on the video screen.

15. The safety network according to claim 14, wherein the unique location comprises a non-private location.

16. A safety network comprising:
a location indicator configured to identify a unique location in a facility;
a portable first electronic device configured to read the location indicator;
a portable second electronic device configured to unlock a lock at the unique location,
a third electronic device,
wherein the portable first electronic device is configured to transmit a first electronic signal associated with the location indicator to the third electronic device, the first electronic signal including information that the lock has been unlocked, the third electronic device being configured to receive the first electronic signal and to record information related to the first electronic signal to a database, wherein the first electronic signal also includes information about the location, the information including a number of the location and a time that the lock was unlocked.

17. The safety network according to claim 16, wherein the first electronic device is configured to passively read the location indicator.

18. The safety network according to claim 16, wherein the portable second electronic device comprises a wrist band.

* * * * *